(12) United States Patent
Asaoka et al.

(10) Patent No.: US 11,892,815 B2
(45) Date of Patent: Feb. 6, 2024

(54) DIAGNOSTIC APPARATUS

(71) Applicant: FANUC CORPORATION, Yamanashi (JP)

(72) Inventors: Hiroyasu Asaoka, Yamanashi (JP); Atsushi Horiuchi, Yamanashi (JP); Kenjirou Shimizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 745 days.

(21) Appl. No.: 17/083,295

(22) Filed: Oct. 29, 2020

(65) Prior Publication Data

US 2021/0132579 A1  May 6, 2021

(30) Foreign Application Priority Data

Nov. 5, 2019 (JP) .................... 2019-200916

(51) Int. Cl.
| | |
|---|---|
| *G05B 19/4065* | (2006.01) |
| *G07C 3/00* | (2006.01) |
| *G06N 20/00* | (2019.01) |
| *F16H 57/01* | (2012.01) |
| *B29C 45/76* | (2006.01) |

(52) U.S. Cl.
CPC ........ *G05B 19/4065* (2013.01); *B29C 45/768* (2013.01); *F16H 57/01* (2013.01); *G06N 20/00* (2019.01); *G07C 3/005* (2013.01); *B29C 2945/76013* (2013.01); *B29C 2945/76949* (2013.01); *G05B 2219/33303* (2013.01); *G05B 2219/45244* (2013.01)

(58) Field of Classification Search
None
See application file for complete search history.

(56) References Cited

U.S. PATENT DOCUMENTS

| | | |
|---|---|---|
| 2002/0062194 A1 | 5/2002 | Kliman et al. |
| 2007/0093976 A1 | 4/2007 | Nishizawa et al. |
| 2018/0281256 A1 | 10/2018 | Asaoka et al. |

FOREIGN PATENT DOCUMENTS

| | | |
|---|---|---|
| JP | H9178546 A | 7/1997 |
| JP | H11262932 A | 9/1999 |
| JP | 2000193560 A | 7/2000 |
| JP | 200790477 A | 4/2007 |
| JP | 2013216030 A | 10/2013 |
| JP | 2018167424 A | 11/2018 |

*Primary Examiner* — Carlos R Ortiz Rodriguez
(74) *Attorney, Agent, or Firm* — HAUPTMAN HAM, LLP

(57) ABSTRACT

A diagnostic apparatus includes a control unit configured to control a diagnostic operation for driving a belt, a first tension calculation unit configured to perform, based on data obtained from the diagnostic operation, a calculation to estimate a first belt tension value that is a tension value of the belt when the belt is not worn, a second tension calculation unit configured to calculate a second belt tension value in a case where a tension reduction factor of the belt and a wear factor of the belt are included, and a third tension calculation unit configured to calculate the degree of wear of the belt based on the first belt tension value and the second belt tension value. Accordingly, the diagnostic apparatus can support estimation of the degree of wear of a belt or abnormality diagnosis.

7 Claims, 8 Drawing Sheets

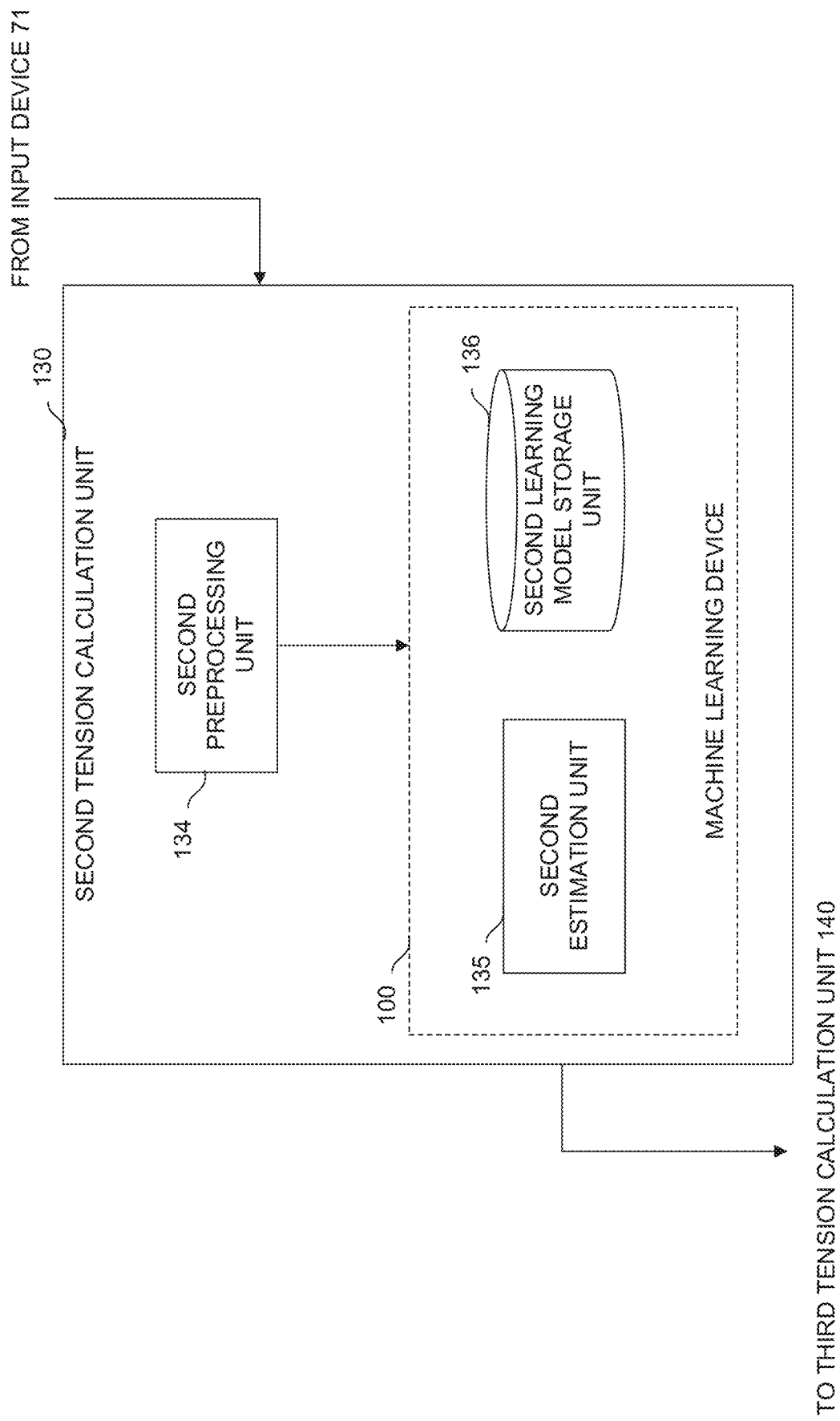

DIAGNOSTIC APPARATUS

RELATED APPLICATION

The present application claims priority to Japanese Application Number 2019-200916 filed Nov. 5, 2019, the disclosure of which is hereby incorporated by reference herein in its entirety.

BACKGROUND OF THE INVENTION

1. Field of the Invention

The present invention relates to a diagnostic apparatus, particularly to a diagnostic apparatus that diagnoses the degree of wear of a belt that transmits power.

2. Description of the Related Art

There are industrial machines that transmits rotation power of a motor to an axis via power transmission means such as a timing belt. When a timing belt is used as the power transmission means in an industrial machine, performing a specific operation for the purpose of maintenance is useful as a method for indirectly estimating the state of the belt, as proposed in Japanese Patent Laid-Open No. 2013-216030, Japanese Patent Laid-Open No. 2000-193560, Japanese Patent Laid-Open No. 2007-90477, Japanese Patent Laid-Open No. H11-262932, Japanese Patent Laid-Open No. H09-178546, or Japanese Patent Laid-Open No. 2018-167424.

The state of the belt can be estimated, for example, from some events such as a delay in the movement of an axis, a difference in the movement amount, and the like (relative to an operation of a motor), which can be observed when the specific operation is performed. Such events observed during the specific operation are caused by a deviation from a normal state of the belt due to a tension reduction factor and a belt wear (abrasion, crack, peeling, and the like on a fracture surface) factor. As mentioned above, there is a plurality of factors relevant to the deviation from the normal state of the belt. The conventional belt state estimation relying on such a specific operation results in belt abnormality measurement and estimation reflecting the inclusion of these factors.

In general, when manually checking the tension of a belt, a worker stops the rotation of the belt and disassembles a machine so that the belt is exposed. At this time, a worn state of the belt can be determined by visually inspecting the belt. However, it may be difficult to perform visual inspection when a machine belt is partly concealed by other parts (or components). In addition, the maintenance of a belt by visual inspection depends on the skill of each worker. Therefore, in a site where many machines are installed, it is impossible to perform the visual maintenance work on all these machines with a smaller number of skilled workers. Therefore, a current situation is such that only the belt tension adjustment is set as a maintenance item for many machines, and the machines are used without visually checking the state of wear of each belt.

In contrast, when a specific diagnostic operation such as frequency sweep is performed, particularly when the state of a timing belt is determined from eigenfrequency, the abnormality appears as a result of coincidence of two factors, i.e., the timing belt tension reduction factor and the timing belt wear factor, described above. Therefore, it is difficult to grasp only the wear of the timing belt by the specific diagnostic operation.

SUMMARY OF THE INVENTION

Because of the above-described situation, there is a demand for a mechanism capable of diagnosing the degree of wear of a belt by a relatively simple method other than visual inspection.

One aspect of the present invention is a diagnostic apparatus that diagnoses the degree of wear of a belt that is provided in an industrial machine and transmits power, including a control unit configured to control a diagnostic operation for driving the belt, a first tension calculation unit configured to perform, based on data obtained from the diagnostic operation, a calculation to estimate a first belt tension value that is a tension value of the belt when the belt is not worn, a second tension calculation unit configured to calculate a second belt tension value in a case where a tension reduction factor of the belt and a wear factor of the belt are included, and a third tension calculation unit configured to calculate the degree of wear of the belt based on the first belt tension value and the second belt tension value. According to one aspect of the present invention, the degree of wear of a belt can be diagnosed by a relatively simple method other than the visual inspection. In particular, a belt used in an injection molding machine is located at a portion where it is difficult for a maintenance worker to perform visual inspection. Further, since there are various molds, it is difficult to create a general-purpose determination formula and a machine learning model for determining the wear only from eigenfrequency. Therefore, the method of the present invention, according to which the wear of a belt can be determined by a relatively simple method other than the visual inspection, is useful.

BRIEF DESCRIPTION OF THE DRAWINGS

The above and other objects and features of the present invention will be apparent from the following description of embodiments with reference to the accompanying drawings. Of those figures:

FIG. 8 is a block diagram illustrating schematic functions of a modified second tension calculation unit according to a third embodiment.

DETAILED DESCRIPTION OF THE PREFERRED EMBODIMENTS

Hereinafter, embodiments of the present invention will be described with reference to the drawings.

Figure 1:
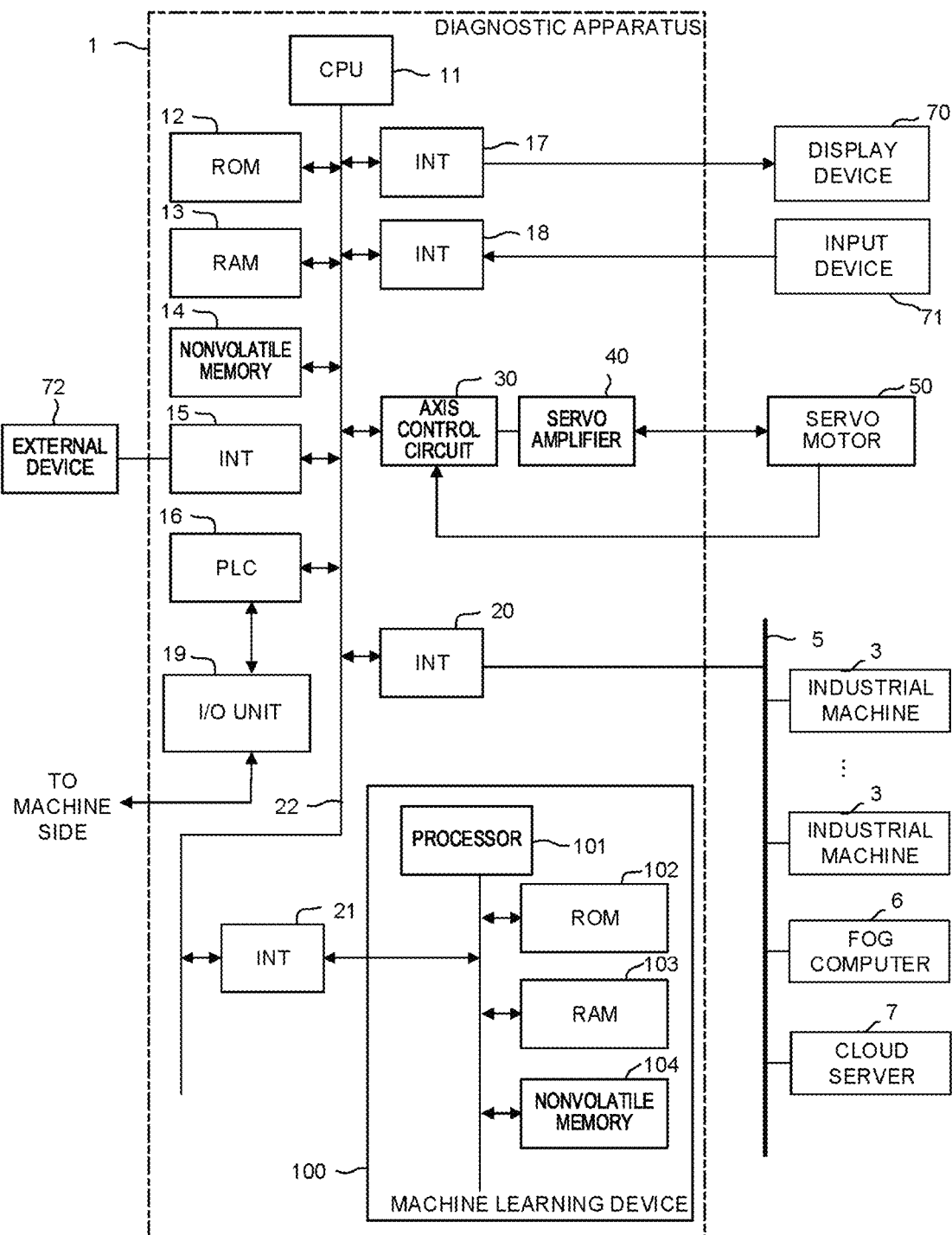
FIG. 1 is a schematic hardware configuration diagram illustrating a diagnostic apparatus according to an embodiment.

FIG. 1 is a schematic hardware configuration diagram illustrating essential components of a diagnostic apparatus according to an embodiment of the present invention. A diagnostic apparatus 1 can be implemented as a control device that controls an industrial machine such as an injection molding machine based on a control program, for example. Further, the diagnostic apparatus 1 can be implemented on a personal computer attached to a control device that controls an industrial machine based on a control program, or on a personal computer, a cell computer, a fog computer 6, and a cloud server 7, which are connected to a control device via a wired/wireless network. In the present embodiment, the diagnostic apparatus 1 is an example implemented as the control device that controls an industrial machine based on a control program.

A central processing unit (CPU) 11 included in the diagnostic apparatus 1 according to the present embodiment is a processor that totally controls the diagnostic apparatus 1. The CPU 11 reads a system program stored in a read only memory (ROM) 12 via a bus 22, and controls the entire diagnostic apparatus 1 according to the system program. Temporary calculation data, display data, various data input from the outside, and the like are temporarily stored in a random access memory (RAM) 13.

A nonvolatile memory 14 is configured, for example, by a memory backed up by a battery (not illustrated), a solid state drive (SSD), or the like, and holds a storage state even when the power of the diagnostic apparatus 1 is turned off. Control programs and data read from an external device 72 via an interface 15, control programs and data input via an input device 71, and control programs and data acquired from other devices via a network 5, and the like are stored in the nonvolatile memory 14. The control programs and data stored in the nonvolatile memory 14 may be developed in the RAM 13, when executed and used. Further, various system programs such as a known analysis program are written in advance in the ROM 12.

The interface 15 connects the CPU 11 of the diagnostic apparatus 1 and the external device 72 such as a USB device. For example, control programs and setting data to be used for controlling the industrial machine are read from the external device 72. Further, control programs and setting data edited in the diagnostic apparatus 1 can be stored in an external storage means via the external device 72. A programmable logic controller (PLC) 16 executes a ladder program and outputs signals, via an I/O unit 19, to the industrial machine and peripheral devices (for example, a tool changer, an actuator such as a robot, and sensors such as a temperature sensor and a humidity sensor attached to the industrial machine) of the industrial machine, and controls the industrial machine and the peripheral devices. Further, the PLC 16 receives, via the I/O unit 19, signals from various switches on an operation panel provided in a main body of the industrial machine and from the peripheral devices, and after performing necessary signal processing, sends the processed signals to the CPU 11.

An interface 20 connects the CPU 11 of the diagnostic apparatus 1 and the wired or wireless network 5. Other industrial machineries 3, the fog computer 6, the cloud server 7, and the like are connected to the network 5 and communicate with the diagnostic apparatus 1 to exchange data.

A display device 70 displays each data read on the memory, data obtained as a result of execution of a program or the like, data output from a machine learning device 100 described below, and the like, which are output via an interface 17. Further, the input device 71 configured by a keyboard, a pointing device, and the like sends a command based on a worker operation, data input by the worker, and the like, via an interface 18, to the CPU 11.

An axis control circuit 30 for controlling axes included in the industrial machine receives an axis move command amount from the CPU 11 and outputs the axis command to a servo amplifier 40. In response to this command, the servo amplifier 40 drives a servo motor 50 that moves the axes included in the industrial machine. The servo motor 50 incorporates a position-and-speed detector (not illustrated), and feeds back a position-and-speed feedback signal from the position-and-speed detector to the axis control circuit 30. The axis control circuit 30 performs position-and-speed feedback control using the position-and-speed feedback signal.

In FIG. 1, the hardware configuration diagram is illustrated as having only one axis control circuit 30, only one servo amplifier 40, and only one servo motor 50, although these components may be prepared as much as the number of the axes provided in the industrial machine to be controlled, actually. Further, at least one servo motors 50 is connected to a predetermined axis of the industrial machine by means of a belt serving as a power transmission part.

An interface 21 connects the CPU 11 and the machine learning device 100. The machine learning device 100 includes a processor 101 that controls the entire machine learning device 100, a ROM 102 that stores system programs and the like, a RAM 103 that is used for temporary storage in each processing relating to the machine learning, and a nonvolatile memory 104 that is used to store a learning model and the like. The machine learning device 100 can observe each piece of information (e.g., data indicating an operating state of the servo motor 50, and detection values of a temperature sensor and a humidity sensor (which are not illustrated)) that can be acquired by the diagnostic apparatus 1 via the interface 21. Further, the diagnostic apparatus 1 acquires, via the interface 21, processing results output from the machine learning device 100. The diagnostic apparatus 1 stores and displays the acquired processing results, and transmits the processing results to other devices via the network 5 or the like.

Figure 2:
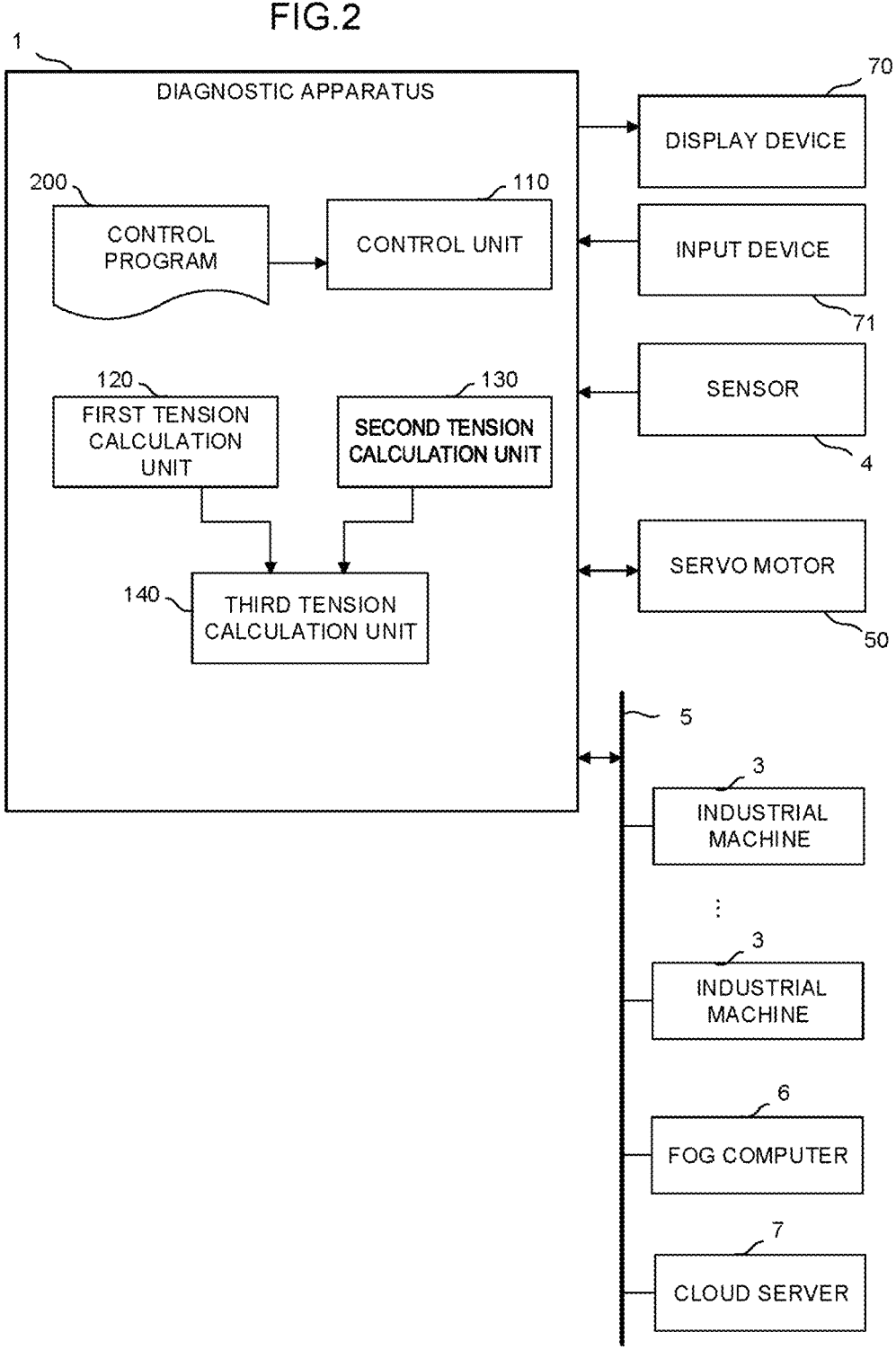
FIG. 2 is a block diagram illustrating schematic functions of a diagnostic apparatus according to a first embodiment.

FIG. 2 is a schematic block diagram illustrating various functions of the diagnostic apparatus 1 according to a first embodiment of the present invention. Each function of the diagnostic apparatus 1 according to the present embodiment can be realized by the CPU 11 included in the diagnostic apparatus 1 and the processor 101 included in the machine learning device 100, which are illustrated in FIG. 1 and execute the system programs to control operations of respective parts of the diagnostic apparatus 1 and the machine learning device 100.

The diagnostic apparatus 1 of the present embodiment includes a control unit 110, a first tension calculation unit 120, a second tension calculation unit 130, and a third tension calculation unit 140. Further, a control program 200 for controlling the servo motor 50 provided in the industrial machine is stored in advance in the RAM 13 and the nonvolatile memory 14 of the diagnostic apparatus 1.

The control unit 110 can be realized by the CPU 11 of the diagnostic apparatus 1 illustrated in FIG. 1 that executes system programs read from the ROM 12 for arithmetic processing mainly performed by the CPU 11 using the RAM 13 and the nonvolatile memory 14, processing for causing the axis control circuit 30 and the PLC 16 to control respective parts of the industrial machine, and input/output processing via the interface 18. The control unit 110 analyzes each block of the control program 200, and controls each part of the industrial machine based on analysis results. For example, when the block of the control program 200 issues a command to drive each axis of the industrial machine, the control unit 110 generates move command data according to the command by the block and outputs the move command data to the servo motor 50. Further, for example, when the block of the control program 200 commands to cause a peripheral device such as a sensor 4 attached to the industrial machine to operate, the control unit 110 generates a predetermined signal for enabling the peripheral device to operate and output the generated signal to the PLC 16. On the other hand, the control unit 110 acquires a speed feedback gain of the servo motor 50 and detection value data detected by the sensor 4 such as the temperature sensor and the humidity sensor, and outputs the acquired information to each tension calculation unit as required.

The control program 200 includes a block for a diagnostic operation that causes in advance the servo motor 50 driving the belt to perform a sweep operation at a rotation speed (frequency) in a predetermined range. Further, the control program 200 includes a block issuing a command to acquire the speed feedback gain of the servo motor 50 during the sweep operation as time series data. Further, the control program 200 includes a block issuing a command to cause the sensor 4 to acquire the detection value data, at least, at the start of the sweep operation, during the sweep operation, or at the end of the sweep operation. The diagnostic operation based on the control program 200 may be performed at a plurality of positions of a timing belt. the diagnostic operation may be performed under a plurality of conditions. Further, the diagnostic operation may be carried out on a plurality of initial conditions caused by different meshing conditions of the belt with the machine of various attitude and the diagnostic behavior. Generally, the wearing of the belt is apt to be produced as partial damage thereof and so many conditions of wearing are known as a damages. The partial wear or damage of the belt can be addressed in high precision by making the diagnosis on the basis of a plurality of data obtained on a variety of positions or conditions of the belt.

The first tension calculation unit 120 can be realized by the CPU 11 included in the diagnostic apparatus 1 and the processor 101 included in the machine learning device 100 illustrated in FIG. 1 executing the system programs read from the ROM 12 and the ROM 102, respectively, to perform arithmetic processing mainly by the CPU 11 using the RAM 13 and the nonvolatile memory 14, perform arithmetic processing by the processor 101 using the RAM 103 and the nonvolatile memory 104, and perform input/output processing via the interface 18 and the interface 21. The first tension calculation unit 120 acquires the speed feedback gain from the servo motor 50 when the industrial machine is operating and the detection value data detected by the sensor 4, and performs, based on the acquired acquisition data, a calculation to estimate a tension value of a belt equipped in the industrial machine. The first tension calculation unit 120 receives the acquisition data from the control unit 110. The belt tension value calculated by the first tension calculation unit 120 is obtainable when the industrial machine is equipped with a non-worn belt and is caused to perform a specific diagnostic operation and is a tension estimation value of the belt when the above acquisition data has been acquired.

Figure 3:
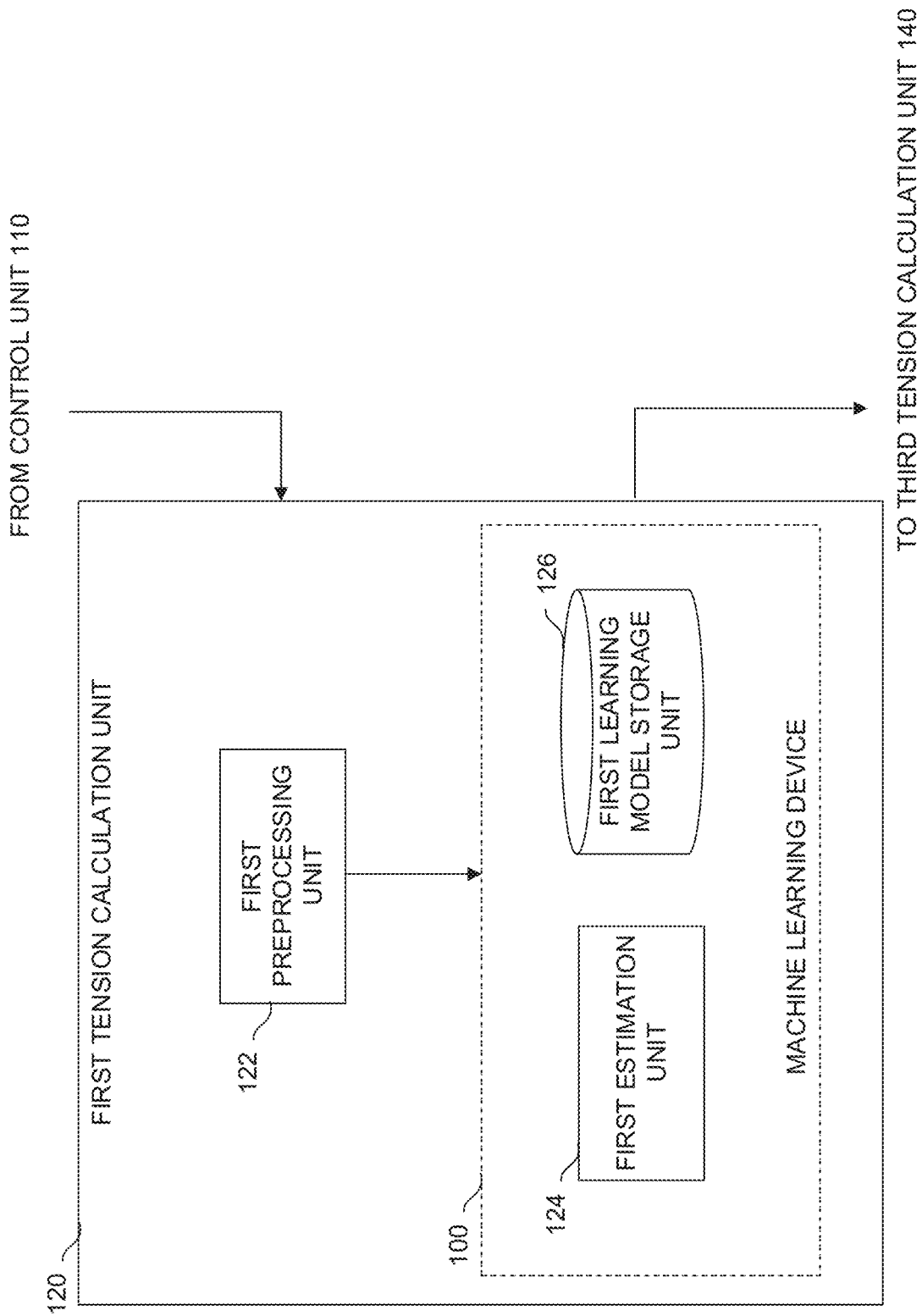
FIG. 3 is a block diagram illustrating schematic functions of a first tension calculation unit according to the first embodiment.

FIG. 3 is a block diagram illustrating schematic functions of the first tension calculation unit 120 according to the present embodiment. The first tension calculation unit 120 includes a first preprocessing unit 122 and a first estimation unit 124. Further, a first learning model storage unit 126 that stores a first learning model having learned to estimate the belt tension value in the industrial machine equipped with a non-worn belt is provided on the RAM 103 or the nonvolatile memory 104.

The first preprocessing unit 122 creates, based on the acquisition data acquired from the control unit 110, state data to be used in machine learning processing by the machine learning device 100, and outputs the created state data to the machine learning device 100. The first preprocessing unit 122 creates estimation data S1 including frequency response data representing frequency-gain characteristics obtained by frequency analyzing the speed feedback gain of the servo motor 50 acquired from the control unit 110, for example. The estimation data S1 created by the first preprocessing unit 122 may be any data as long as it is suitable as an input for the first learning model stored in the first learning model storage unit 126.

Figure 4:
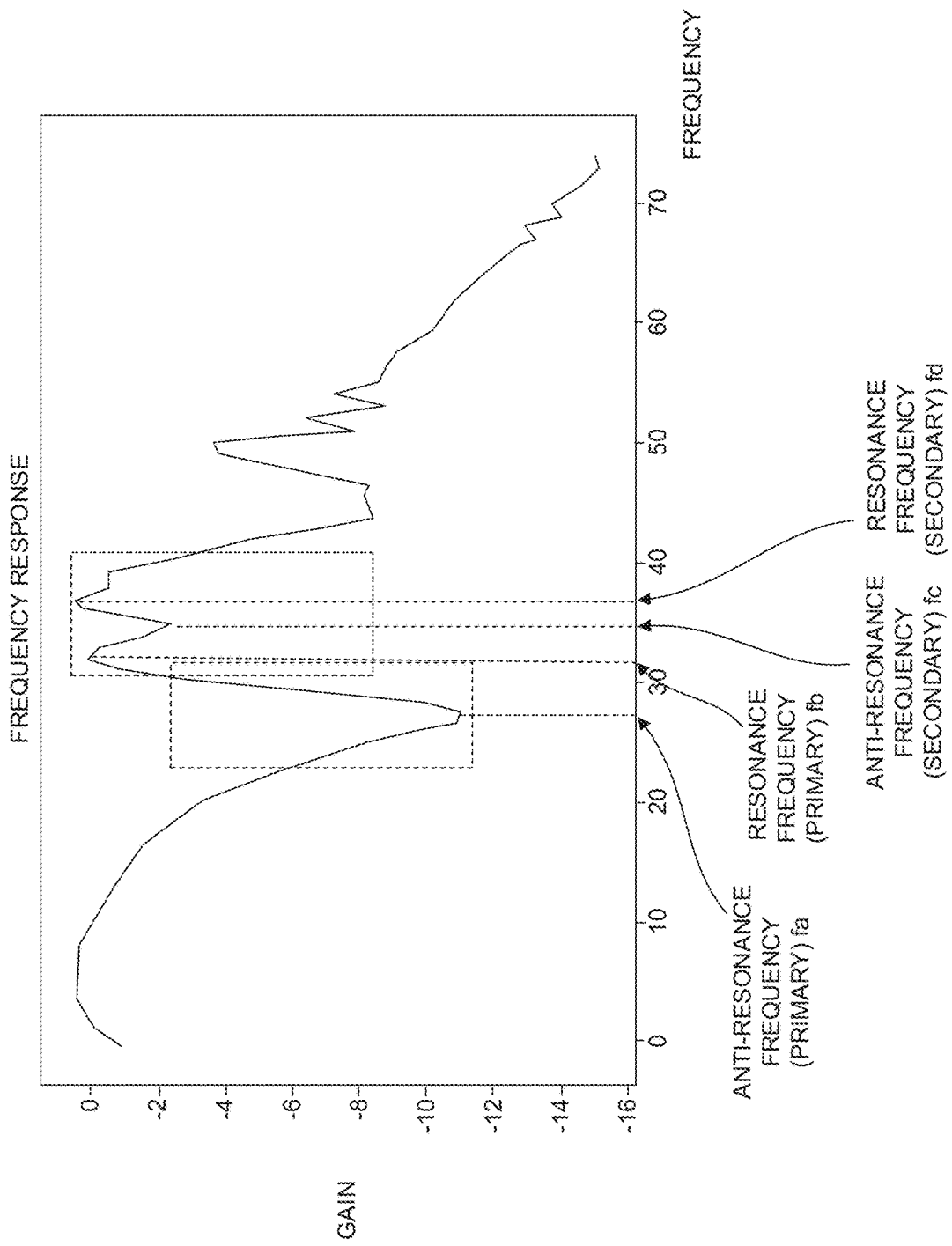
FIG. 4 is a diagram illustrating an example of frequency response data.

As an example, the frequency response data serving as the estimation data S1 may be data obtainable by sampling a gain value in a predetermined frequency range at a predetermined frequency cycle. At this time, it is desirable that the frequency response data serving as the estimation data S1 includes a range including both primary resonance frequency and primary anti-resonance frequency as a pair. FIG. 4 is a diagram illustrating exemplary frequency analysis on the speed feedback gain. According to the example illustrated in FIG. 4, a valley of the anti-resonance frequency is present at a position of fa, and a peak of the resonance frequency is present at a position of fb. It is sufficient that the first preprocessing unit 122 creates, as the frequency response data to be used for the estimation data S1, series data on the frequency-gain pair obtained by sampling, at the predetermined frequency cycle, predetermined ranges before and after such positions where the peak of the resonance frequency and the valley of anti-resonance frequency are present. In addition to the above, the frequency response data serving as the estimation data S1 may include a range including both secondary or higher resonance frequency and secondary or higher anti-resonance frequency as a pair. Further, the first preprocessing unit 122 may add, to the frequency response data serving as the estimation data S1, a series of values in predetermined ranges around the anti-resonance frequency and the resonance frequency.

The first estimation unit 124 executes, based on the estimation data S1 created by the first preprocessing unit 122, belt tension value estimation processing using the first learning model stored in the first learning model storage unit 126, and outputs an estimation result. The estimation processing to be performed by the first estimation unit 124 is estimation processing using the first learning model created in known supervised learning. For example, in a case where the first learning model stored in the first learning model storage unit 126 is the one created as a neural network (convolutional neural network), the first estimation unit 124 inputs the estimation data S1 created by the first preprocessing unit 122 into the neural network, and outputs an estimation value of the belt tension value, resulting from the network, as the estimation result. The belt tension value estimated by the first estimation unit 124 is output, as a first belt tension value, to the third tension calculation unit 140.

The first learning model stored in the first learning model storage unit 126 is a learning model created by supervised learning using input data (input data including frequency response data representing frequency-gain characteristics) created based on acquisition data acquired when an industrial machine equipped with a non-wear belt is caused to perform a specific diagnostic operation in various belt tension states, and belt tension values of the industrial machine in respective belt tension states as label data.

The second tension calculation unit 130 can be realized by the CPU 11 included in the diagnostic apparatus 1 and the processor 101 included in the machine learning device 100, which are illustrated in FIG. 1 and execute the system programs read from the ROM 12 and the ROM 102, respectively, for arithmetic processing mainly performed by the CPU 11 using the RAM 13 and the nonvolatile memory 14, and input processing via the interface 18. The second tension calculation unit 130 acquires or detects a belt tension value in the industrial machine. The belt tension value acquired or detected by the second tension calculation unit 130 is a belt tension value that includes a timing belt tension reduction factor and a timing belt wear factor.

Figure 5:
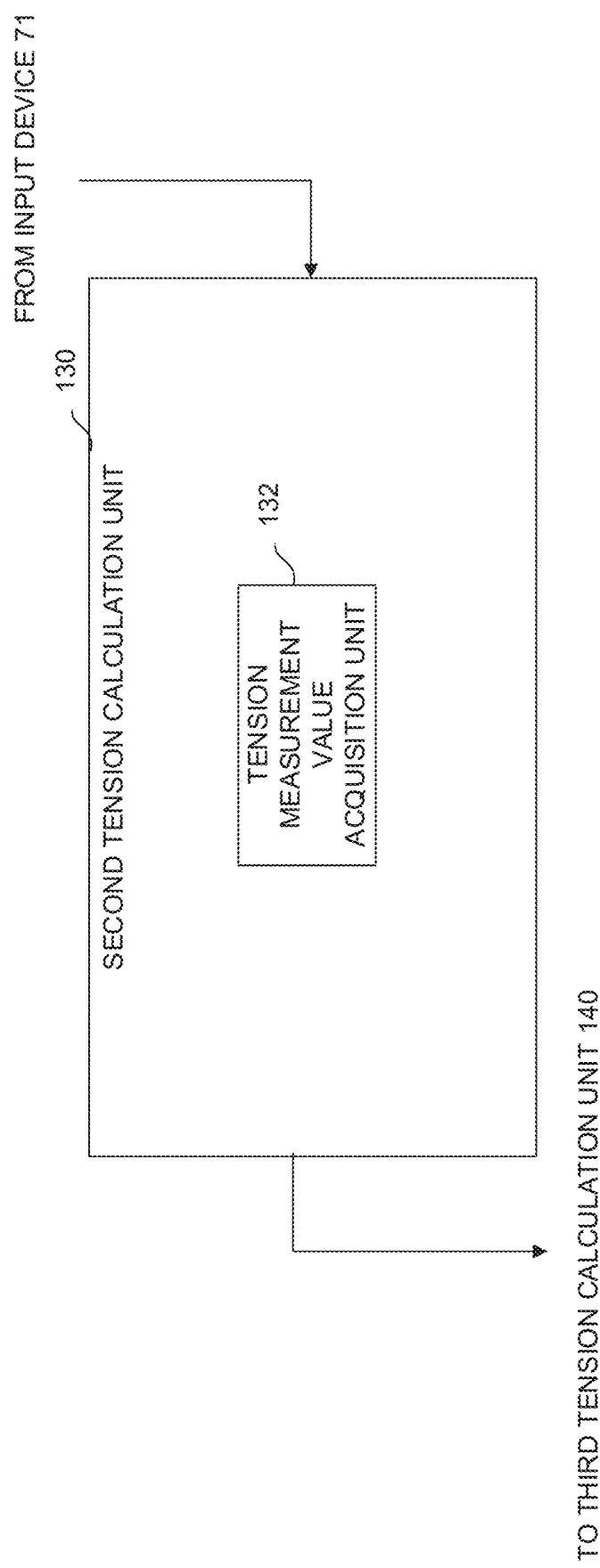
FIG. 5 is a block diagram illustrating a schematic functions of a second tension calculation unit according to the first embodiment.

FIG. 5 is a block diagram illustrating a schematic function of the second tension calculation unit 130 according to the present embodiment. The second tension calculation unit 130 includes a tension measurement value acquisition unit 132.

The tension measurement value acquisition unit 132 acquires a belt tension value of the industrial machine input by a worker, via the input device 71. For example, the worker stops the belt of the industrial machine and measures a belt tension value by using a tension meter such as a sonic belt tension meter or a dial gauge. Then, the worker inputs the measured belt tension value via the input device 71. The tension measurement value acquisition unit 132 outputs the acquired belt tension value, as a second belt tension value, to the third tension calculation unit 140.

The third tension calculation unit 140 can be realized by the CPU 11 included in the diagnostic apparatus 1 and processor 101 included in the machine learning device 100 illustrated in FIG. 1 executing the system programs read from the ROM 12 and the ROM 102, to perform arithmetic processing mainly by the CPU 11 using the RAM 13 and the nonvolatile memory 14.

Figure 6:
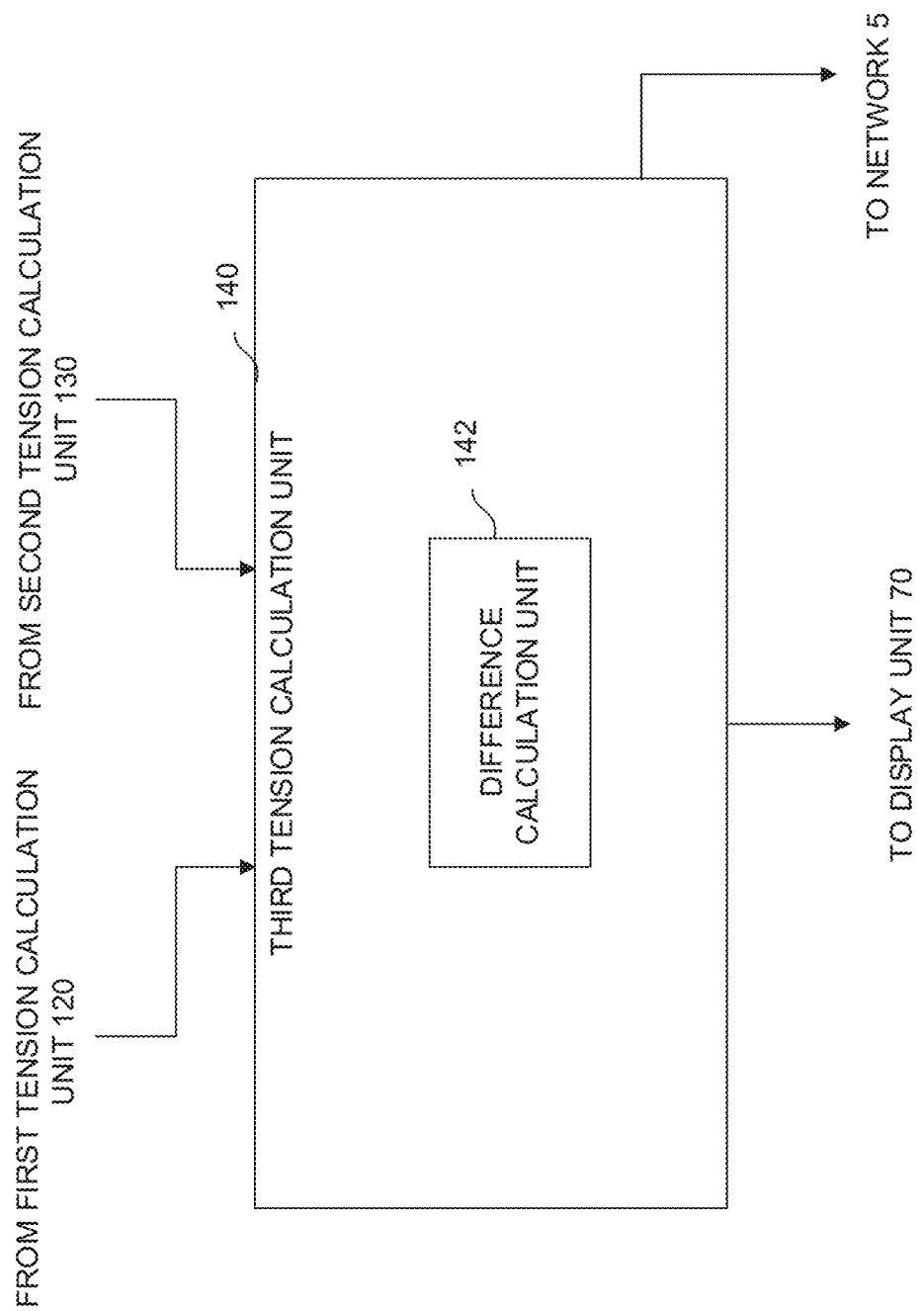
FIG. 6 is a block diagram illustrating a schematic function of a third tension calculation unit according to the first embodiment.

FIG. 6 is a block diagram illustrating a schematic function of the third tension calculation unit 140 according to the present embodiment. The third tension calculation unit 140 includes a difference calculation unit 142.

The difference calculation unit 142 calculates a difference between the first belt tension value input from the first tension calculation unit 120 and the second belt tension value input from the second tension calculation unit 130. The first belt tension value is a belt tension value when only the timing belt tension reduction estimated based on the data detected from the present industrial machine is a factor. The second belt tension value is a belt tension value that includes the timing belt tension reduction factor and the timing belt wear factor. The difference calculation unit 142 calculates a value relating to the worn state of the timing belt, by calculating a difference between these two values. The difference calculation unit 142 may apply the calculated difference value to a predetermined calculation formula to calculate a predetermined value indicating the degree of wear of the timing belt (for example, wear [mm] or wear rate [%]). Further, the first belt tension value and the second belt tension value may be input in advance, and a third learning model for estimating the predetermined degree of wear of a belt may be created. Then, the third learning model may be used to perform a calculation to estimate the degree of wear of the timing belt. The value calculated by the difference calculation unit 142 may be displayed on the display device 70 or may be transmitted to another computer, such as the fog computer 6 or the cloud server 7, via the network 5.

The diagnostic apparatus 1 according to the present embodiment, which has the above-mentioned configuration, can calculate the degree of wear of a belt of an industrial machine based on data acquired during a specific diagnostic operation of the industrial machine and results of a manual measurement by a worker. The data acquisition through the specific diagnostic operation of the industrial machine is automatically performed by the control program 200. Further, the manual measurement of the belt tension can be performed easily by an unskilled worker according to an operation manual. Therefore, the wear of the belt can be detected relatively easily.

As a modified example of the diagnostic apparatus 1 according to the present embodiment, the third tension calculation unit 140 included in the diagnostic apparatus 1 may be configured to compare a predetermined threshold value set in advance with the calculated degree of wear of the belt, and when the calculated degree of wear of the belt exceeds the predetermined threshold value, outputs information indicating that the state of the belt is abnormal. According to such a configuration, not only the degree of wear of the belt can be displayed but also diagnosing normality/abnormality of the belt can be performed.

Figure 7:
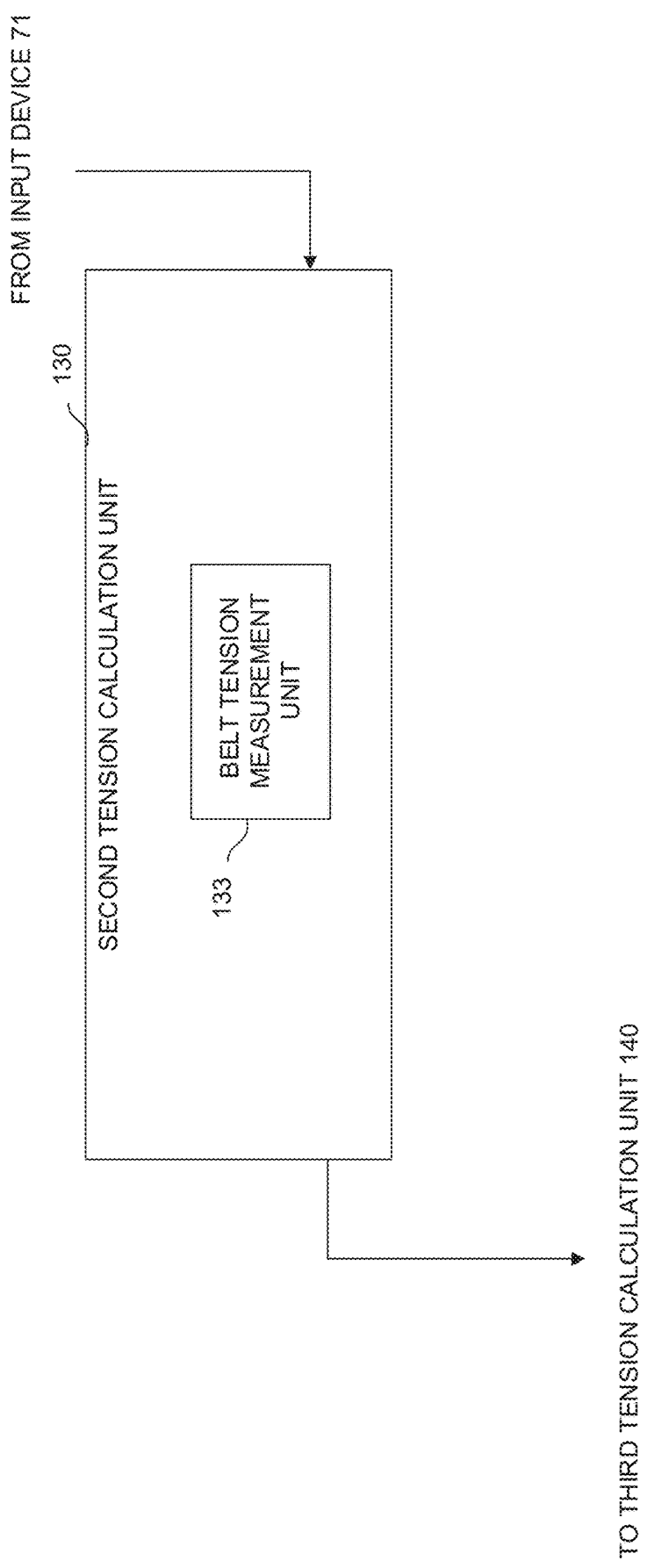
FIG. 7 is a block diagram illustrating a schematic function of a modified second tension calculation unit according to a second embodiment.

FIG. 7 is a block diagram illustrating a schematic function of a modified second tension calculation unit 130 included in the diagnostic apparatus 1 according to a second embodiment. Other functions of the present embodiment are the same as those described in the first embodiment.

The second tension calculation unit 130 according to the present embodiment can be realized by the CPU 11 included in the diagnostic apparatus 1 and the processor 101 included in the machine learning device 100, which are illustrated in FIG. 1 and execute the system programs read from the ROM 12 and the ROM 102, respectively, for arithmetic processing mainly performed by the CPU 11 using the RAM 13 and the nonvolatile memory 14, and input/output processing performed via the interface 18. The second tension calculation unit 130 according to the present embodiment includes a belt tension measurement unit 133.

The belt tension measurement unit 133 measures the belt tension value of an industrial machine using an automatic belt tension measurement method, which is already known from, for example, six patent documents described in the field of the related art of this specification. Using the known automatic belt tension measurement method can measure a belt tension value that includes the timing belt tension reduction factor and the timing belt wear factor. Since the above automatic belt tension measurement method is generally known from other documents, no detailed description thereof is included in this specification. The belt tension value measured by the belt tension measurement unit 133 is output, as the second belt tension value, to the third tension calculation unit 140.

The diagnostic apparatus 1 according to the present embodiment, which has the above-mentioned configuration, can calculate the degree of wear of a belt of an industrial machine based on data acquired during a specific diagnostic operation of the industrial machine and results of a measurement by a predetermined automatic measurement technique.

FIG. 8 is a block diagram illustrating schematic functions of a modified second tension calculation unit 130 included in the diagnostic apparatus 1 according to a third embodiment. Other functions of the present embodiment are the same as those described in the first embodiment.

The second tension calculation unit 130 according to the present embodiment can be realized by the CPU 11 included in the diagnostic apparatus 1 and the processor 101 included in the machine learning device 100 illustrated in FIG. 1 executing the system programs read from the ROM 12 and the ROM 102, respectively, to perform arithmetic processing mainly by the CPU 11 using the RAM 13 and the nonvolatile memory 14, perform arithmetic processing by the processor 101 using the RAM 103 and the nonvolatile memory 104, and perform input/output processing via the interface 18 and the interface 21.

The second tension calculation unit 130 according to the present embodiment includes a second preprocessing unit 134 and a second estimation unit 135. Further, a second learning model storage unit 136 configured to store a second learning model having learned to estimate the belt tension value in the industrial machine is provided on the RAM 103 or the nonvolatile memory 104.

The second tension calculation unit 130 according to the present embodiment acquires the speed feedback gain acquired from the servo motor 50 when the industrial machine is operating and the detection value data detected by the sensor 4, and performs, based on the acquired acquisition data, a calculation to estimate a tension value of a belt equipped in the industrial machine. The second tension calculation unit 130 receives the acquisition data from the control unit 110. The belt tension value calculated by the second tension calculation unit 130 is obtainable when the industrial machine is caused to perform a specific diagnostic operation and is a tension estimation value of the belt when the above acquisition data has been acquired.

The second preprocessing unit 134 creates, based on the acquisition data acquired from the control unit 110, state data to be used in machine learning processing by the machine learning device 100, and outputs the created state data to the machine learning device 100. The second preprocessing unit 134 creates estimation data S2 including frequency response data representing frequency-gain characteristics obtained by frequency analyzing the speed feedback gain of the servo motor 50 acquired from the control unit 110, for example. The estimation data S2 created by the second preprocessing unit 134 may be any data as long as it is suitable as an input for the second learning model stored in the second learning model storage unit 136.

The second estimation unit 135 executes, based on the estimation data S2 created by the second preprocessing unit 134, belt tension value estimation processing using the second learning model stored in the second learning model storage unit 136, and outputs an estimation result. The estimation processing to be performed by the second estimation unit 135 is estimation processing using the second learning model created in known supervised learning. For example, in a case where the second learning model stored in the second learning model storage unit 136 is the one created as a neural network (convolutional neural network), the second estimation unit 135 inputs the estimation data S2 created by the second preprocessing unit 134 into the neural network, and outputs an estimation value of the belt tension value, resulting from the network as the estimation result.

The belt tension value estimated by the second estimation unit 135 is output, as the second belt tension value, to the third tension calculation unit 140.

The second learning model stored in the second learning model storage unit 136 is a learning model created by supervised learning using, as label data, input data (input data including frequency response data representing frequency-gain characteristics) created based on acquisition data acquired when an industrial machine equipped with belts of various worn states is caused to perform a specific diagnostic operation in various belt tension states, and belt tension values of the industrial machine in respective belt tension states.

The diagnostic apparatus 1 according to the present embodiment, which has the above-mentioned configuration, uses data acquired during a specific diagnostic operation of an industrial machine and can calculate the degree of wear of a belt of the industrial machine based on the first belt tension value estimated from the first learning model and the second belt tension value estimated from the second learning model.

Although some embodiments of the present invention have been described above, the present invention is not limited to the above-described examples of the embodiments and can be implemented in various ways by applying modifications as appropriate.

The invention claimed is:

1. A diagnostic apparatus that diagnoses a degree of wear of a belt that is provided in an industrial machine and transmits power, comprising: a control unit configured to control a diagnostic operation for driving the belt;
   wherein the diagnostic operation comprises: (i) issuing a command causing the belt to be driven at a plurality of position of the belt or under or a plurality of conditions and (ii) issuing a command causing one or more sensors to acquire detection value data under the plurality of conditions;
   a first tension calculation unit configured to perform, based on data obtained from the diagnostic operation, a calculation to estimate a first belt tension value that is a tension value of the belt when the belt is not worn; a second tension calculation unit configured to calculate a second belt tension value in a case where a tension reduction factor of the belt and a wear factor of the belt are included; and a third tension calculation unit configured to calculate the degree of wear of the belt based on the first belt tension value and the second belt tension value;
   wherein the third tension calculation unit calculates the degree of wear in accordance with iterations of the diagnostic operation.

2. The diagnostic apparatus according to claim 1, wherein the diagnostic operation is a frequency sweep operation and the first tension calculation unit estimates the first belt tension value by using a feedback signal obtained by the frequency sweep operation as an input.

3. The diagnostic apparatus according to claim 1, wherein the first tension calculation unit estimates the first belt tension value by using a first learning model learned with an input including data acquired when a non-wear belt is used.

4. The diagnostic apparatus according to claim 1, wherein the second tension calculation unit calculates the second belt tension value including the tension reduction factor of the belt and the wear factor of the belt by means different from that of the first tension calculation unit.

5. The diagnostic apparatus according to claim 1, wherein the second tension calculation unit estimates the second belt tension value by using a second learning model learned with an input including data acquired when belts of various wear degrees are used.

6. The diagnostic apparatus according to claim 1, wherein the second tension calculation unit acquires a belt tension value measured by a measurement device, and sets the acquired value as the second belt tension value.

7. The diagnostic apparatus according to claim 1, wherein the industrial machine is an injection molding machine.

* * * * *